(12) United States Patent
Mock et al.

(10) Patent No.: US 7,181,689 B2
(45) Date of Patent: Feb. 20, 2007

(54) METHOD FOR SORTING AND DISPLAYING A MULTIPLE USER DATABASE

(75) Inventors: Von Alan Mock, Boynton Beach, FL (US); Eric Thomas Eaton, Lake Worth, FL (US); David Jeffery Hayes, Lake Worth, FL (US)

(73) Assignee: Motorola Inc., Schaumburg, IL (US)

( * ) Notice: Subject to any disclaimer, the term of this patent is extended or adjusted under 35 U.S.C. 154(b) by 124 days.

(21) Appl. No.: 10/334,845

(22) Filed: Dec. 31, 2002

(65) Prior Publication Data

US 2004/0125142 A1    Jul. 1, 2004

(51) Int. Cl.
G06F 3/00 (2006.01)
(52) U.S. Cl. ............ 715/703; 715/747; 715/963
(58) Field of Classification Search ............ 345/700, 345/703, 744–745, 747, 750, 764, 963; 705/8, 705/9; 715/700, 703, 744, 745, 747, 750, 715/764, 963
See application file for complete search history.

(56) References Cited

U.S. PATENT DOCUMENTS

| | | | |
|---|---|---|---|
| 4,831,552 A | | 5/1989 | Scully et al. |
| 5,070,470 A | * | 12/1991 | Scully et al. ............ 708/112 |
| 5,528,745 A | * | 6/1996 | King et al. ............ 345/753 |
| 5,899,979 A | * | 5/1999 | Miller et al. ............ 705/9 |
| 6,396,512 B1 | | 5/2002 | Nickerson |
| 6,457,062 B1 | * | 9/2002 | Pivowar et al. ............ 709/248 |
| 6,466,236 B1 | * | 10/2002 | Pivowar et al. ............ 715/835 |
| 6,640,230 B1 | * | 10/2003 | Alexander et al. ............ 707/10 |
| 2002/0165753 A1 | * | 11/2002 | Worthington ............ 705/8 |
| 2003/0120717 A1 | * | 6/2003 | Callaway et al. ............ 709/201 |
| 2003/0129569 A1 | * | 7/2003 | Callaway et al. ............ 434/108 |

FOREIGN PATENT DOCUMENTS

EP        001122672 A2  *  8/2001
WO       WO 00/62146 A1    10/2000

* cited by examiner

Primary Examiner—Sy D. Luu
(74) Attorney, Agent, or Firm—Joseph T. Cygan

(57) ABSTRACT

A method for organizing and displaying multiple calendars (200, 300, 400, and 500) from multiple devices (102, 104, 106, and 108) to give an appearance of a single user calendar (1100 and 1200) on a user's device is disclosed. Each calendar event having associated user category such as time (210), self (204), family (206), and work (208), is organized based on a display preference selected by a user. Desired calendar events organized based on the display preference are displayed (1100, 1200) on a selected device. Calendar events displayed have different visual attributes based on the corresponding associated users.

2 Claims, 12 Drawing Sheets

| \_ | MOTHER | | |
|---|---|---|---|
| TIME | SELF | FAMILY | WORK |
| 7:00 AM | TENNIS (BRING EXTRA RACKET) | | |
| 8:00 AM | | | |
| 9:00 AM | | | MEETING RM 102 (TRANSPARENCIES) |
| 10:00 AM | | | |
| 11:00 AM | | | PICK UP CONTRACT (SEE KIM) |
| 12:00 PM | | | |
| 1:00 PM | | | |
| 2:00 PM | | | |
| 3:00 PM | | | |
| 4:00 PM | COFFEE WITH ANNE | | MEETING RM 400 (SEND NOTICES) |
| 5:00 PM | | PICK UP SON | |
| 6:00 PM | | | |
| 7:00 PM | | | |
| 8:00 PM | | MOVIE | |

*FIG. 2*

| TIME | SELF | FATHER FAMILY | WORK |
|---|---|---|---|
| 7:00 AM | | | |
| 8:00 AM | | DROP OFF KIDS ~306 | |
| 9:00 AM | | | |
| 10:00 AM | | | MEETING RM 305 ~308 |
| 11:00 AM | | | |
| 12:00 PM | | | LUNCH WITH CLIENT ~310 |
| 1:00 PM | | | PRINT REPORT ~311 |
| 2:00 PM | | | |
| 3:00 PM | | | |
| 4:00 PM | | | REPORT DUE ~312 (MAKE 5 COPIES) ~314 |
| 5:00 PM | YMCA ~304 | | |
| 6:00 PM | | | |
| 7:00 PM | | | |
| 8:00 PM | | MOVIE ~228 | |

| | | DAUGHTER | |
|---|---|---|---|
| TIME | SELF | FAMILY | WORK |
| 7:00 AM | | | |
| 8:00 AM | | | |
| 9:00 AM | | | |
| 10:00 AM | | | |
| 11:00 AM | CALCULUS TEST ~404 | | |
| 12:00 PM | | | |
| 1:00 PM | | | |
| 2:00 PM | | | |
| 3:00 PM | | | |
| 4:00 PM | | | PIZZARIA ~410<br>(PICK UP A PIZZA) ~412 |
| 5:00 PM | | | |
| 6:00 PM | 406 | | |
| 7:00 PM | HOMEWORK (MOBY DICK p. 35-85) ~408 | | |
| 8:00 PM | | MOVIE | ~228 |

| \| | SON | |
|---|---|---|
| TIME | SELF | FAMILY |
| 7:00 AM | | |
| 8:00 AM | | |
| 9:00 AM | | |
| 10:00 AM | | |
| 11:00 AM | | |
| 12:00 PM | | |
| 1:00 PM | | |
| 2:00 PM | | |
| 3:00 PM | FOOTBALL PRACTICE | |
| 4:00 PM | | |
| 5:00 PM | | |
| 6:00 PM | HOMEWORK | |
| 7:00 PM | | |
| 8:00 PM | | MOVIE |

FIG. 5

| TIME | WORK |
|---|---|
| 7:00 AM | |
| 8:00 AM | |
| 9:00 AM | MEETING RM 102 (TRANSPARENCIES) |
| 10:00 AM | 308 ~ WORK |
| 11:00 AM | 230 ~ PICK UP CONTRACT |
| 12:00 PM | WORK |
| 1:00 PM | 310 |
| 2:00 PM | |
| 3:00 PM | 222 ~ MEETING RM 400 / 216 ~ (SEND NOTICES) — PIZZARIA |
| 4:00 PM | REPORT DUE — PIZZARIA |
| 5:00 PM | 312  1104 |
| 6:00 PM | |
| 7:00 PM | |
| 8:00 PM | |

FIG. 11

METHOD FOR SORTING AND DISPLAYING A MULTIPLE USER DATABASE

FIELD OF THE INVENTION

The present invention generally relates to a method for organizing and displaying a multiple user database, and more specifically to an application executable in an electronic device.

BACKGROUND OF THE INVENTION

The falling prices and increased competition in the Personal Digital Assistant ("PDA") business are aiding the development of the next group or family of applications for these organizers. Most PDAs and other mobile electronic organizers in the market place support calendar and other personal management and organization functions. World wide web, or Internet, applications, which can support larger display screens and provide users with more pleasing viewing experience, are becoming more common. Some organizers can be synchronized with other devices such as another personal computer ("PC") or another compatible organizer, allowing the user to import a calendar and other organization and management files from the other device. The synchronized files then can be displayed on the screen of the mobile electronic organizer using contrasting colors to differentiate one file from another. However, applications currently available do not distinguish between relevant and irrelevant events relative to the user. When a first user synchronizes his mobile electronic organizer with a second user, and displays both schedules on the screen, the screen may be filled with the second user's scheduled events that are of no interest to the first user. Even with a large screen on a PDA, cluttered and undesired information displayed would be unwelcome.

With a growing popularity of wireless devices such as cellular telephones, it is conceivable that every member of a family will have a cellular telephone having a capability of a mobile electronic organizer, and keep his schedule on his cellular telephone. For example, a mother may wish to see on her mobile electronic organizer a schedule of only when and where she needs to be to pick up her children in addition to her own personal schedule. However, each child may keep in his mobile electronic organizer his personal schedule such as school homework reminder, TV show schedule, play time, etc. in addition to when and where his mother needs to be to pick him up. If the mother synchronized her mobile electronic organizer with the mobile electronic organizers of her children, and displayed on her screen all the scheduled events on her mobile electronic organizer, the screen might become so cluttered such that it might not be so useful.

Accordingly, there is a need for a method for sorting and displaying a multiple user database providing an appearance of a single user calendar.

BRIEF DESCRIPTION OF THE DRAWINGS

FIG. 2 is an exemplary calendar of the first user.

FIG. 3 is an exemplary calendar of the second user.

FIG. 4 is an exemplary calendar of the third user.

FIG. 5 is an exemplary calendar of the fourth user.

FIG. 11 is a first exemplary composite calendar of the present invention using the calendar events illustrated in FIGS. 2–5.

DETAILED DESCRIPTION OF A PREFERRED EMBODIMENT

The present invention describes a method for organizing and displaying a multiple user data base to give an appearance of a single user calendar on an electronic device such as, but not limited to a portable electronic communication device, a personal computer ("PC"), a personal digital assistant ("PDA"), and a television set. Each calendar event is organized by its user such as mother, father, son or daughter and its category, such as, self, family, and work. The present invention allows a user to create his or her own associations with other users within the same categories as well as allowing to create associations among the categories. Calendar events from multiple users are collected into a single device. Desired calendar events, identified by the corresponding user (mother, father, son or daughter), category (work, family and self), and the user's association with other users within each category, are displayed with various visual attributes to differentiate calendar events belonging to different users. Calendar events of a reference user may be displayed with associated comments while calendar events of other users may be generalized. Although the terms "calendar" and "calendar event" are used throughout the description, these terms are intended to include, but not limited to, to-do and event listings, schedules, and other information to be managed.

Figure 1:
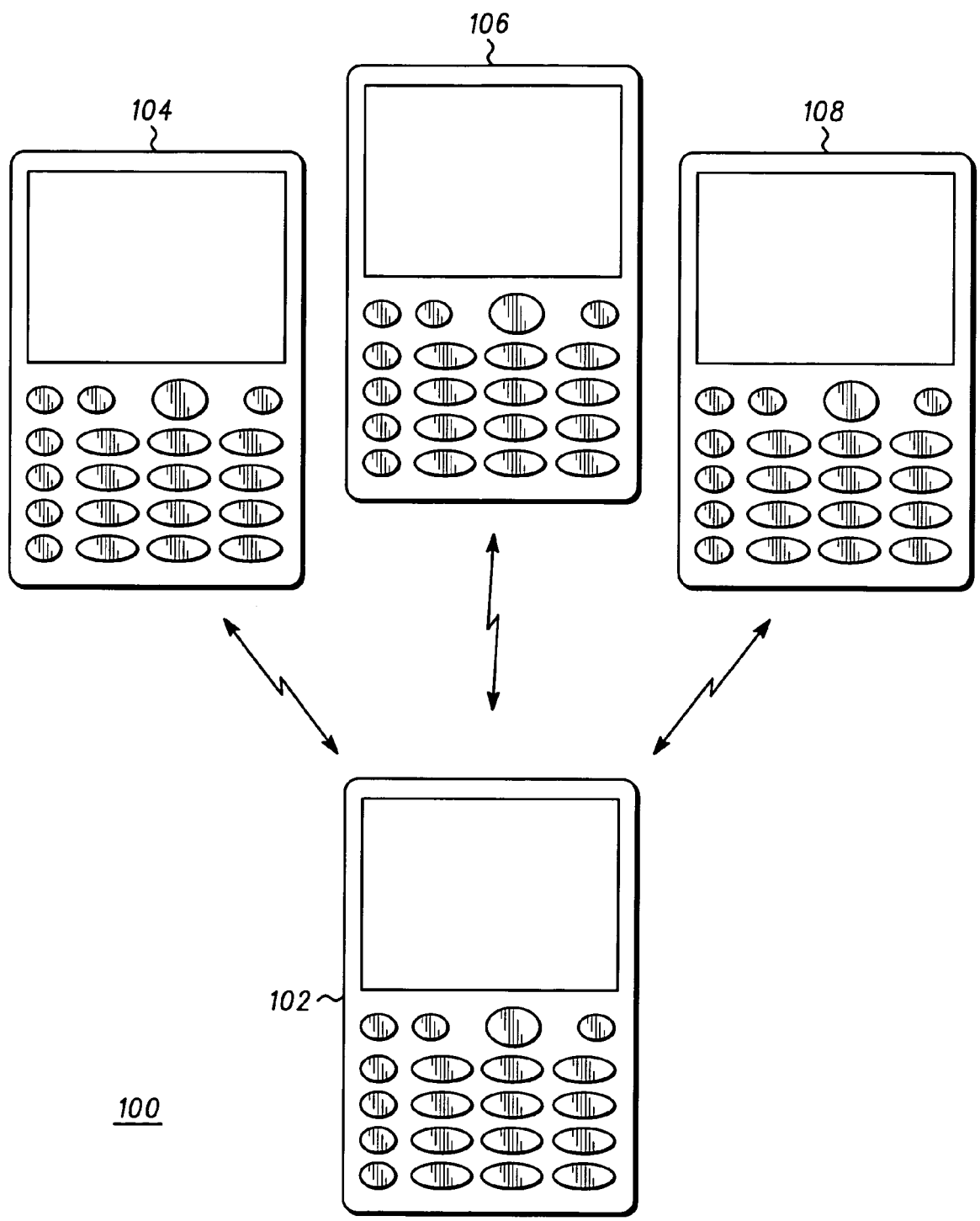
FIG. 1 is an exemplary environment for the present invention.

FIG. 1 illustrates an exemplary environment 100 in which the present invention may be practiced. Each of multiple users, associated with a device (first, second, third, and fourth devices, 102, 104, 106, and 108, respectively, are shown), keeps his or her calendar in his or her device. Alternatively, all the users may use the same single device with each user maintaining his or her own calendar within the device. Each of FIGS. 2–5 illustrates an exemplary calendar showing the structure and calendar events of the first, second, third, and fourth users, respectively. In this example, family members and their scheduled events, or calendar events, are used to illustrate the calendar structure. FIG. 2 illustrates the calendar 200 of the first user, Mother, in the first device 102; FIG. 3 the calendar 300 of the second user, Father, in the second device 104; FIG. 4 the calendar 400 of the third user, Daughter, in the third device 106; and FIG. 5 the calendar 500 of the fourth user, Son, in the fourth device 108. Each calendar event has attributes comprising; a message, a user, a category, comments, and a time period associated with it. For example, in FIG. 2, the user is Mother 202, and categories are Self 204, Family 206, and Work 208. Each calendar event is associated with Time 210, and some calendar events include comment (212, 214, and 216 shown in parentheses next to messages 218, 220, and 222, respectively).

Figure 6:
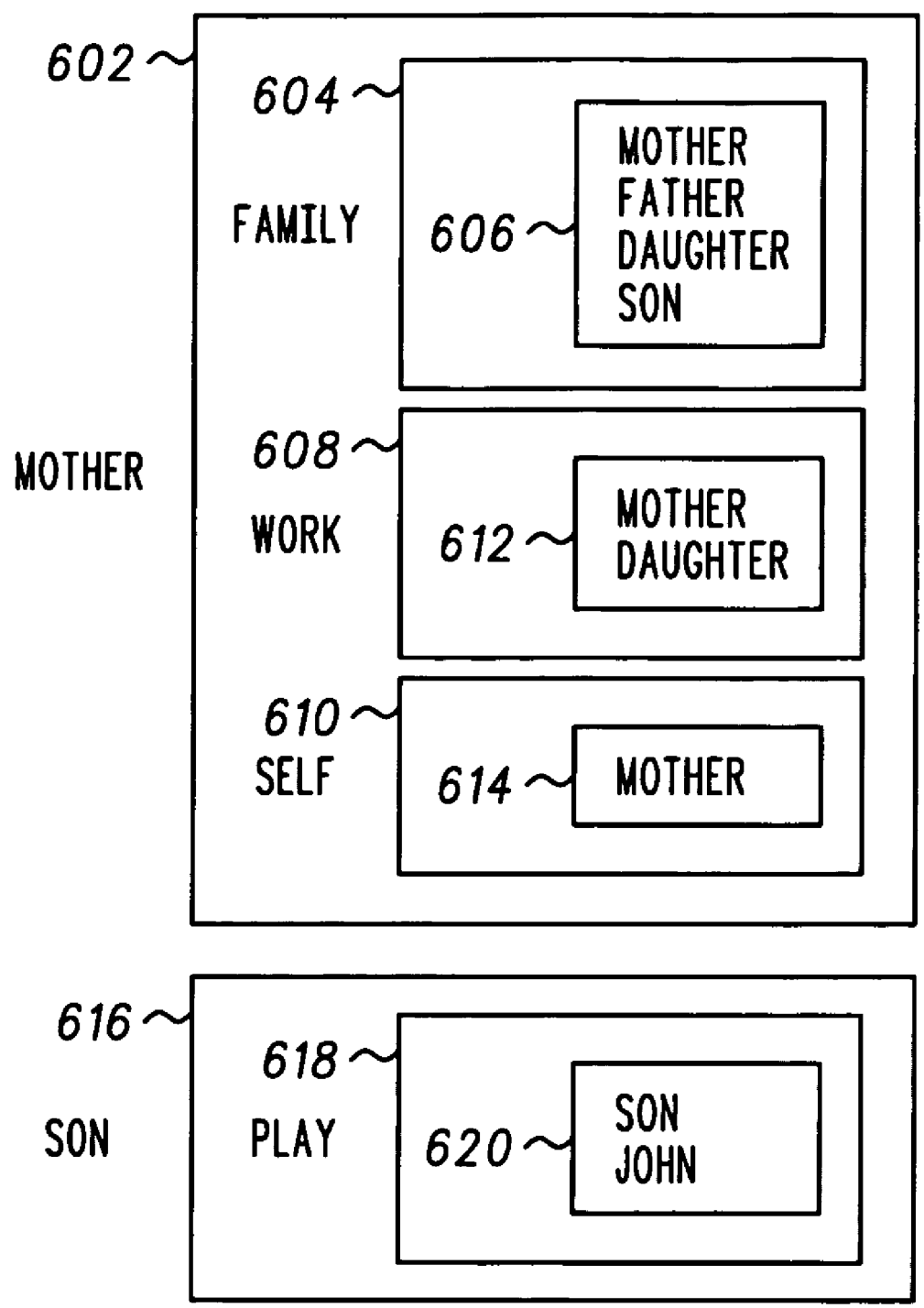
FIG. 6 is an exemplary block diagram illustrating user associations.

FIG. 6 is an exemplary block diagram 600 illustrating organization of the present invention. Each user may create his or her own associations of categories. For example, Mother creates a first association set 602. Within the first association set, Mother has defined a first category set 604 to be Family having association member set 606 comprising Mother, Father, Daughter, and Son as association members. Mother has also defined a second category set 608 to be Work and third category set 610 to be Self, each respectively having association member set 612 comprising Mother and Daughter as association members, and 614 comprising Mother as association member. Son also creates his own set, a second association set 616. Within the second association set, Son has defined a fourth category set 618 to be Play having association member set 620 comprising Son and John as association members. This category set is unique to Son, and may not appear in other user's categories. Alternatively, when all calendars are stored on a single device the associations may be preset in the device. For example, all users may be considered a member of all of the other users' Family category.

When a reference user is selected, the calendar events are displayed in a manner that is meaningful to the reference user. For example, if Mother is selected to be the reference user, and her Family category set is displayed, then the appearance of the calendar events may be different from the appearance of the calendar events preferred and set by Father for the same category. Mother, the reference user, is also allowed to select the level of detail of the calendar events belonging to the association members to be displayed.

Figure 7:
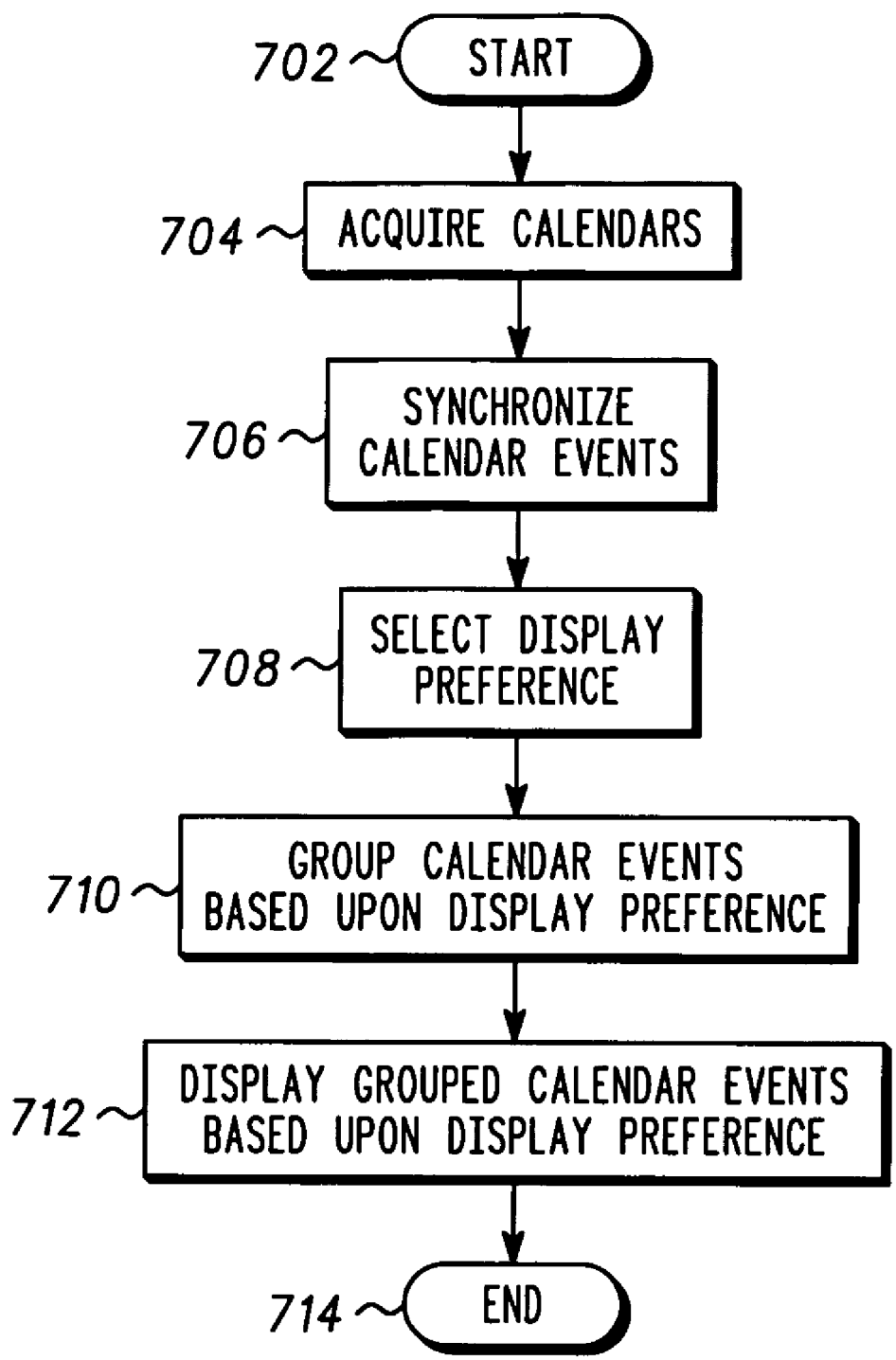
FIG. 7 is an exemplary flowchart for one aspect of the present invention.

FIG. 7 is an exemplary flowchart illustrating an aspect of the present invention. In block 704, the first device 102 acquires the calendar events from the second, third, and fourth devices 104, 106, and 108, respectively. Alternatively, individual calendars residing in a single device may be combined into a single calendar. In this example, Mother, associated with the first device, collects the calendar events of her family members from their corresponding devices: Father with the second device, Daughter with the third device, and Son with the fourth device. In step 706, all the calendar events are synchronized within the first device. For example, all 8:00 PM events are recognized and referenced as 8:00 PM events while maintaining the associated users and categories; all Self category events are recognized and referenced as Self category events while maintaining the associated users and time periods. To give an appearance of a single user calendar, the calendar events need to be displayed in an organized way. In block 708, a display preference is selected and the calendar events are grouped based upon the selected display preference in block 710. The grouped calendar events are then displayed on the first device in block 712, and the process terminates in block 714. The display preference may be based upon any or combination of the attributes attached to the calendar events such as, time, user, category, message, and comments.

Figure 8:
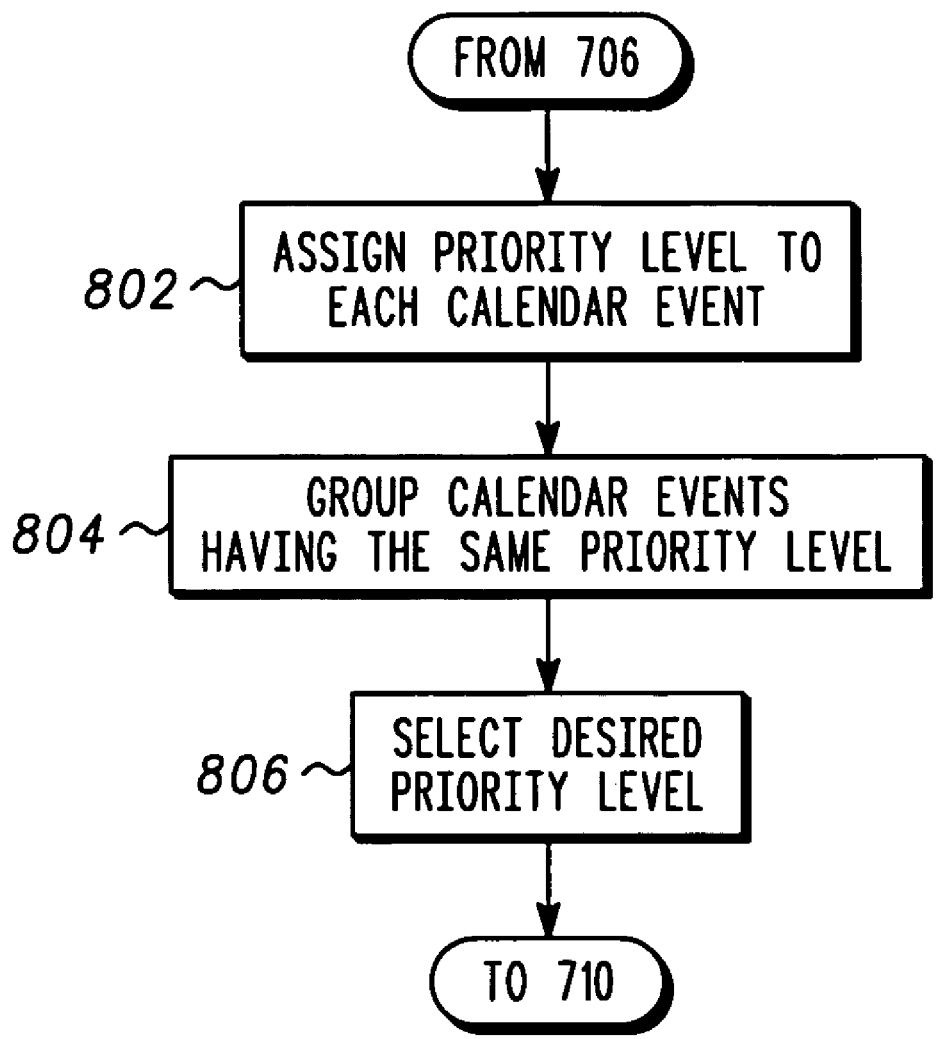
FIG. 8 is an exemplary flowchart further illustrating one embodiment of FIG. 7.

FIG. 8 further illustrates the display preference of block 708. After all calendar events are synchronized in block 706, each calendar event may be assigned a priority level in block 802, and then events having the same priority level are grouped together such that the events are recognized by the priority level in block 804. Assigning of a priority level to each calendar event may be based upon any or combination of its associated time, user, category, message, and comment. A desired priority level is then selected in block 806 which identifies events having the desired priority level as the events to be displayed in block 712.

Figure 9:
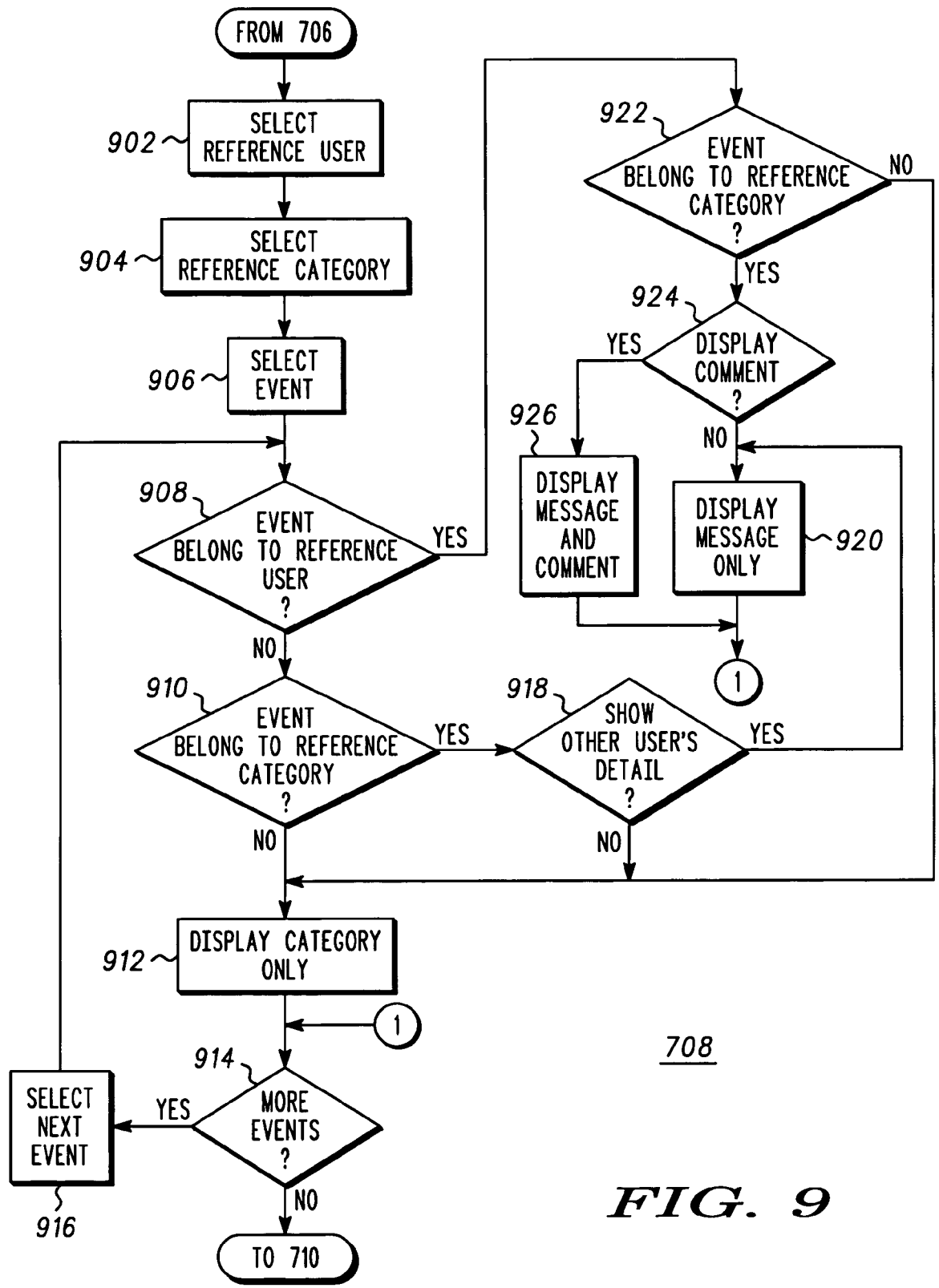
FIG. 9 is an exemplary flowchart further illustrating another embodiment of FIG. 7.

FIG. 9 is an exemplary flowchart further illustrating the display preference selection of block 708. In block 902 a reference user is selected from available users such as Mother, Father, Daughter, and Son, and in step 904 a reference category is selected from available categories such as Self 204, Family 206, and Work 208. In block 906, a calendar event from the synchronized events is selected, and whether the selected event belongs to the reference user is determined in block 908. If the selected event does not belong to the reference user, then whether the selected event belongs to the reference category is determined in block 910. If the selected event does not belong to the reference category, then only the category of the selected event is made available to be displayed in block 912. Then in block 914 whether there are more events to be processed is determined. If there are more events to be processed, then next event is selected in block 916, and the process repeats from block 908. If there are no more events to be processed, then the process proceeds to block 710.

If in block 910, the selected event is determined to belong to the reference category, then in block 918 whether the details of the selected event are to be shown for other users is determined. For example, details may be shown if the user associated with the selected event is classified as a member of the reference user's reference category. Details of the selected event may be made viewable based upon other criteria such as, but not limited to, display preferences applicable only to specific users. For example, Mother may desire to view details of all of Father's events, but may desire to view only the categories of Daughter's events, and to view categories and messages of Son's events. If the details are not to be shown, then only the category of the selected event is made available to be displayed in step 912. Then in block 914 whether there are more events to be processed is determined. The details of the selected event may be deemed to be displayed if the selected event belongs to the reference category and, the user associated with the selected event is associated with the reference user's reference category. If there are more events to be processed, then next event is selected in block 916, and the process repeats from block 908. If there are no more events to be processed, then the process proceeds to block 710. However, if the details are determined to be shown in block 918, then only the message of the selected event is made available to be displayed in block 920. Then in block 914 whether there are more events to be processed is determined. If there are more events to be processed, then next event is selected in block 916, and the process repeats from block 908. If there are no more events to be processed, then the process proceeds to block 710.

If the selected event is determined to belong to the reference user in block 908, then whether the selected event belongs to the reference category is determined in block 922. If the selected event does not belong to the reference category, then only the category of the selected event is made available to be displayed in block 912. Then in block 914 whether there are more events to be processed is determined. If there are more events to be processed, then next event is selected in block 916, and the process repeats from block 908. If there are no more events to be processed, then the process proceeds to block 710.

If the selected event is determined to belong to the reference category in block 922, then whether the comment of the selected event is to be displayed is determined in block 924. The comment may be set to be displayed based upon a specific setting for an individual event, category, and user, or the time remaining to the specific event, or any combination of the above mentioned. For example, the event comment 314 "make 5 copies" may appear as "copies" a week prior to the event, and as the event approaches and becomes a higher priority to the user, it may appear as the full comment "make 5 copies." If the comment of the selected event is not to be displayed, then only the message of the selected event is made available to be displayed in block 920. Then in block 914 whether there are more events to be processed is determined. If there are more events to be processed, then next event is selected in block 916, and the process repeats from block 908. If there are no more events to be processed, then the process proceeds to block 710. If the comment of the selected event is to be displayed, then the message and comment of the selected event are made available to be displayed in block 926. Then in block 914 whether there are more events to be processed is determined. If there are more events to be processed, then next event is selected in block 916, and the process repeats from block 908. If there are no more events to be processed, then the process proceeds to block 710.

Figure 10:
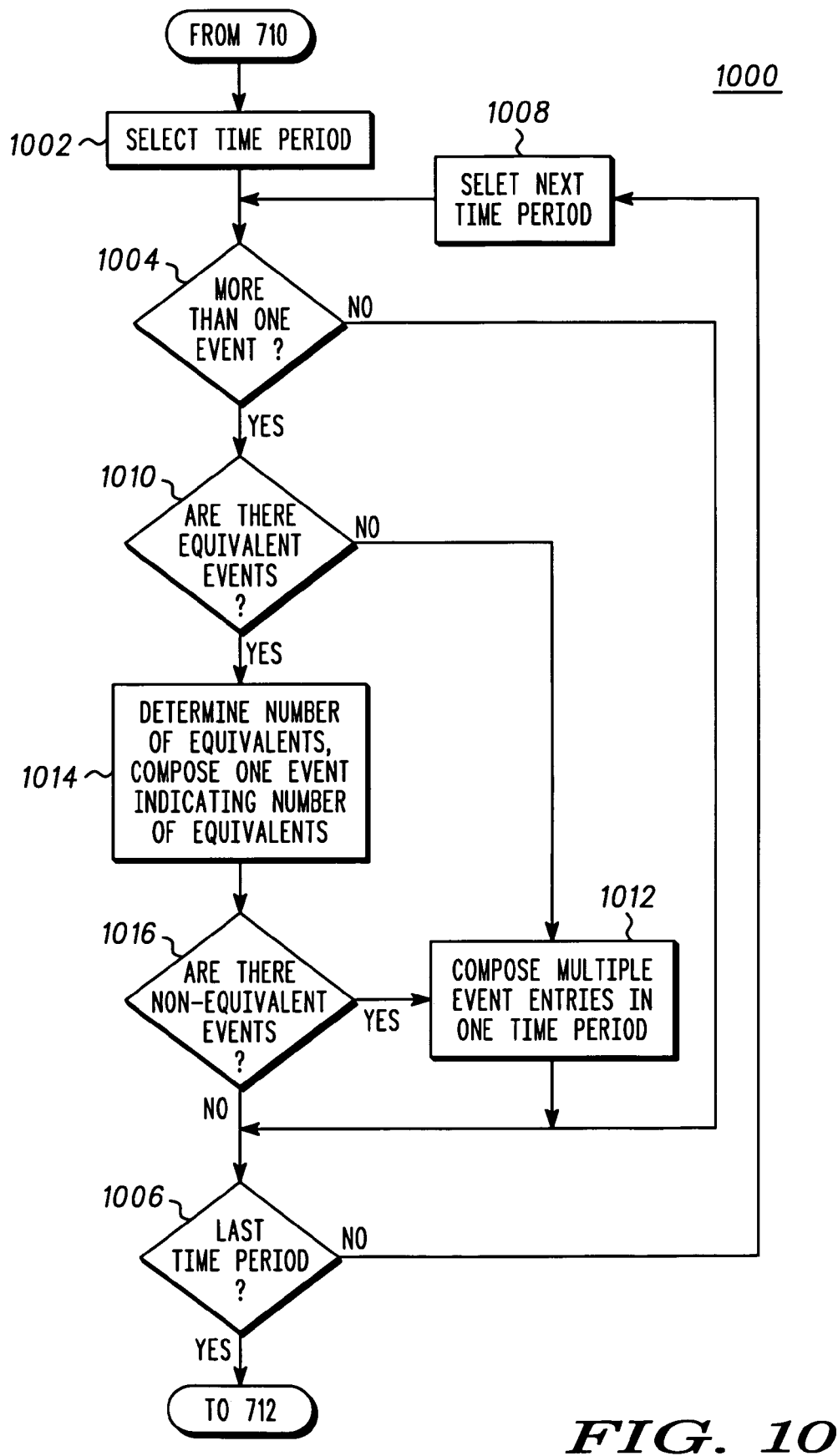
FIG. 10 is an exemplary flowchart illustrating organization of duplicate and multiple calendar events.

FIG. 10 is an exemplary flowchart 1000 illustrating organization of multiple events in a single time period. The calendar events grouped in block 710 may further be organized based upon their equivalency with each other. In block 1002, a first time period is selected, and whether more than one calendar event exists in this single time period is determined in block 1004. If there is only one event in the time period, then no further organization is necessary, and whether there is another time period to be considered is determined in block 1006. If there are no more time periods to be considered, then the process proceeds to block 712. If there is more time period to be considered, then the next time period is selected in block 1008, and the process repeats from block 1004.

If it is determined in block 1004 that there are multiple calendar events in the selected time period, then whether equivalent calendar events, or duplicate calendar events, exist in the selected time period is determined in block 1010. If there are no equivalent calendar events, then all the calendar events in the selected time period are considered to be distinct, and multiple calendar events are created for the selected time period in block 1012. Then whether there is another time period to be considered is determined in block 1006. If there are no more time periods to be considered, then the process proceeds to block 712. If there is more time period to be considered, then the next time period is selected in block 1008, and the process repeats from block 1004.

If it is determined in block 1010 that there are equivalent calendar events, then the number of equivalent calendar events may be determined and a single calendar event, representing multiple equivalent events, is composed with an indicator for multiplicity in block 1014. The indicator may be one or more symbols, numbers or text identifying the number of equivalent events. Additional text descriptions may include abbreviations or other forms of text to identify individuals with the same event as the reference user. For example, all users have the "Movie" event at 8:00 PM with the category of Family. If Mother were to view the Family category, in the 8:00 PM time period, the equivalent events may be represented as "Movie (4)" with "(4)" indicating the number of duplicate events. Then whether there are calendar events remaining in the selected time period that are not equivalent is determined in block 1016. If there are no more calendar events, then whether there is another time period to be considered is determined in block 1006. If there are no more time periods to be considered, then the process proceeds to block 712. If there is more time period to be considered, then the next time period is selected in block 1008, and the process repeats from block 1004.

If it is determined in block 1016 that there are calendar events that are non-equivalent, then multiple calendar events, one representing equivalent calendar events and all non-equivalent calendar events, are created for the selected time period in block 1012. Then whether there is another time period to be considered is determined in block 1006. If there are no more time periods to be considered, then the process proceeds to block 712. If there is more time period to be considered, then the next time period is selected in block 1008, and the process repeats from block 1004.

To differentiate and to identify the user associated with a calendar event, each user may be assigned a visual attribute that is different from other users. The visual attribute may be, but not limited to, contrast and color of the calendar events specific to a particular user. For example, Mother's calendar events may be red, Father's blue, Daughter's green, and Son's yellow.

FIG. 11 is a first exemplary composite calendar 1100 of the present invention using the calendar events illustrated in FIGS. 2–5 with the display preference set to display only events in the Work category 208. In this example, Mother is selected as the reference user in block 902 resulting in the Work category associations 612 being displayed on the first device 102. Only three users, Mother, Father, and Daughter, are involved in this composite calendar, because Son has no Work category events. The users are distinguished from each other by each having a different visual attribute: Mother having a first background (1102), Father having a second background (1104), and Daughter having a third background (1106). In the composite calendar 1100, the messages 220 and 222 of Mother's events are shown with their associated comments 214 and 216 as previously shown in FIG. 2. The comment 232 for Mother's 11:00 am event has been suppressed resulting in only the message 230 being displayed for that event because Mother had initially set to suppress the comment when the event was entered. Because Daughter is not the reference user, only the message 410 is viewable and the associated comment 412 is suppressed for the event belonging to Daughter. Neither the messages 308 and 310 nor comment 314 belonging to Father is displayed since the father is not one of Mother's association members 612 for the reference category. However, even though Father is not an association member, Mother, as the reference user, is able to set an option to display messages for Work events belonging to Father after 3 p.m., and have such messages displayed as shown 312.

Figure 12:
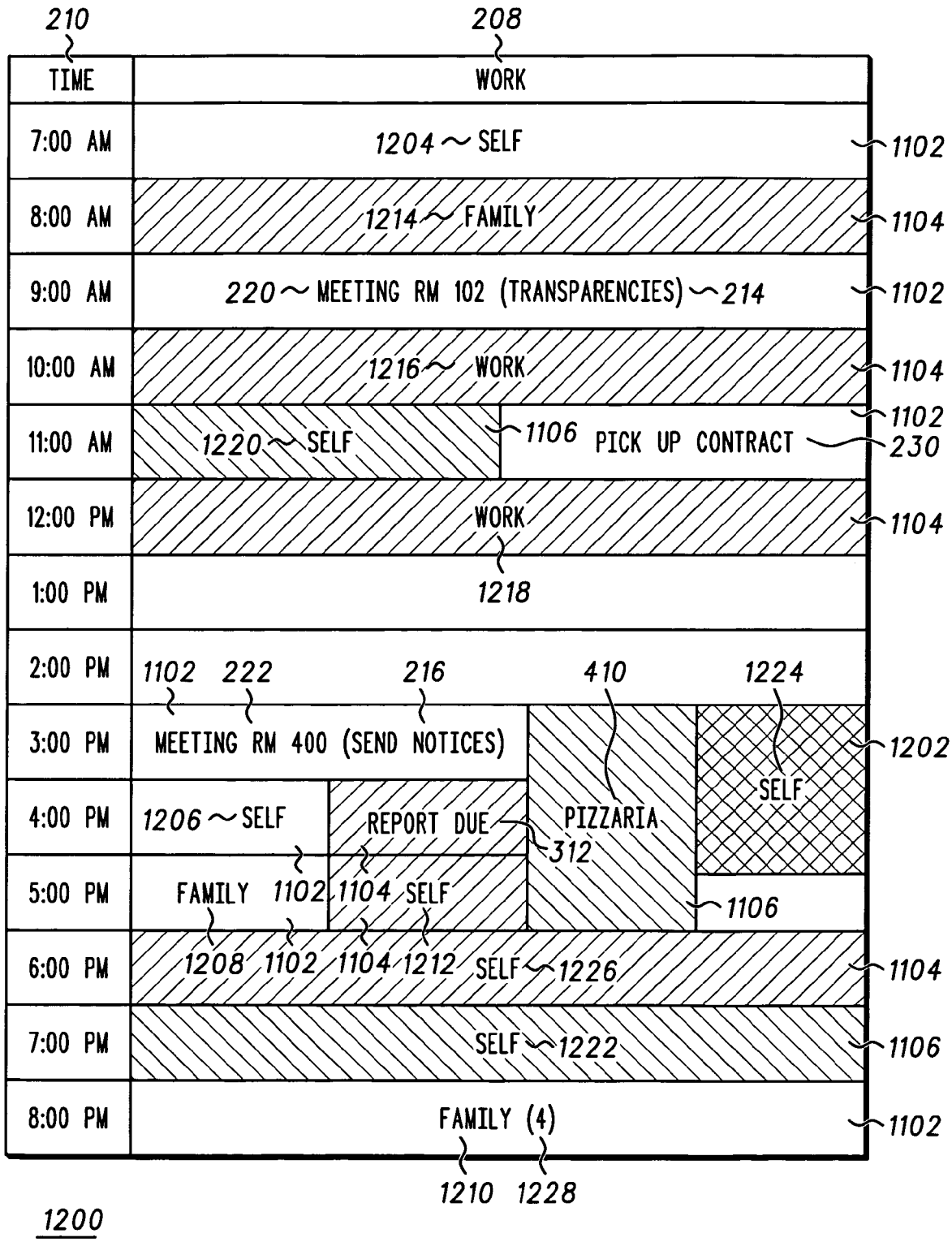
FIG. 12 is a second exemplary composite calendar of the present invention using the calendar events illustrated in FIGS. 2–5.

FIG. 12 is a second exemplary composite calendar 1200 of the present invention using the calendar events illustrated in FIGS. 2–5 with the display preference set to display only events in the Work category 208 as the reference category. In this example, Mother is selected as the reference user resulting in the Work category associations 612 being displayed on the first device 102. Whereas the composite calendar 1100 was restricted to display only events belonging to the Work category, the composite calendar 1200 is configured to display representations of all acquired in block 704. All four users are involved in the composite calendar 1200 who are distinguished by having a different visual attribute: Mother having a first background 1102, Father having a second background 1104, Daughter having a third background 1106, and Son having a fourth background 1202. All events previously shown in the composite calendar 1100 are also shown in the composite calendar 1200 using the same display preferences applied in the composite calendar 1100. In the composite calendar 1200, any calendar event not belonging to the reference category, Work 208, is represented by its associated category. For example, Mother's tennis message 218) with a comment 212 is represented as Self 1204, its associated category. Similarly, all her non-Work events 224, 226, and 228 are represented by their associated categories 1206, 1208, and 1210, respectively. Except for the 4:00 p.m. event 312 for which the previous display preference is applied, all Father's events, 228, 304, 306, 308, and 310 are similarly represented by their associated categories, 1210, 1212, 1214, 1216, and 1218, respectively. Except for her Work event 410, all Daughter's events, 228, 404, and 406, are also represented by their associated categories, 1210, 1220, and 1222, respectively. All of Son's events, 228, 504, and 506 are represented by their associated categories, 1210, 1224, and 1226, respectively. Multiple event entries within the same time period are organized according to the procedure outlined in FIG. 10. For example, at the 4:00 p.m. time period, each of the four users has a different event, and each of these events are shown as 1206, 312, 410, and 1224. Multiple equivalent events within the same time period belonging to the same category are also displayed according to the procedure outlined in FIG. 10. For example, on the composite calendar 1200, the event Movie 228, which—is placed on all the individual calendars 200, 300, 400 and 500 under the Family category 206, is labeled with the term Family 1210 with the number "4" 1228 representing the number of occurrences of this event among the individual calendars. Multiple equivalent events, such as Movie 228, may comprise a combination of unique visual attributes, such as colors and backgrounds, which indicates who the members of the equivalent event are.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for organizing a plurality of calendar events by providing an appearance of a single user calendar on an electronic device, the method comprising:
   acquiring the plurality of calendar events;
   synchronizing the plurality of calendar events;
   selecting a display preference for the plurality of calendar events by:
      selecting a reference user;
      selecting a reference category;
      grouping calendar events that belong to the reference user and to the reference category;
      determining whether each of the plurality of calendar events belongs to the reference user;
      determining whether each of the plurality of calendar events belongs to the reference category; and
      determining whether a calendar event detail setting has been disabled; and
      allowing to display a message associated with each of the grouped calendar events and to display only the category of the calendar event belonging to a user other than the reference user and belonging to the reference category upon determining that the calendar event detail setting has been disabled; and
   displaying at least one calendar event of the plurality of calendar events on the electronic device based upon the display preference.

2. A method for organizing a plurality of calendar events by providing an appearance of a single user calendar on an electronic device, the method comprising:
   acquiring the plurality of calendar events;
   synchronizing the plurality of calendar events;
   selecting a display preference for the plurality of calendar events by:
      selecting a reference user;
      selecting a reference category;
      grouping calendar events that belong to the reference user and to the reference category;
      determining whether each of the plurality of calendar events belongs to the reference user;
      determining whether each of the plurality of calendar events belongs to the reference category; and
      determining whether a calendar event detail setting has been disabled; and
      allowing to display a message associated with each of the grouped calendar events and to display only the category of the calendar event belonging to a user other than the reference user and belonging to the reference category upon determining that the calendar event detail setting has been enabled; and
   displaying at least one calendar event of the plurality of calendar events on the electronic device based upon the display preference.

* * * * *